United States Patent [19]

Best et al.

[11] 4,107,756

[45] Aug. 15, 1978

[54] METHOD AND SYSTEM FOR MAINTAINING AN ELECTRICALLY NEUTRAL ATMOSPHERE

[75] Inventors: Robert H. Best; William D. Harris, both of Greensboro, N.C.

[73] Assignee: Burlington Industries, Inc., Greensboro, N.C.

[21] Appl. No.: 632,007

[22] Filed: Nov. 14, 1975

Related U.S. Application Data

[62] Division of Ser. No. 516,199, Oct. 18, 1974, Pat. No. 3,942,072.

[51] Int. Cl.² ............................................. H05F 1/00
[52] U.S. Cl. ..................................... 361/231; 361/235
[58] Field of Search ..................... 317/4, 262; 321/24, 321/69 R; 361/231, 235

[56] References Cited

U.S. PATENT DOCUMENTS

| | | | |
|---|---|---|---|
| 3,270,270 | 8/1966 | Yenisey | 321/24 X |
| 3,493,838 | 2/1970 | Gyugyi et al. | 321/69 R X |
| 3,936,698 | 2/1976 | Meyer | 317/4 |

*Primary Examiner*—R. N. Envall, Jr.
*Attorney, Agent, or Firm*—Cushman, Darby & Cushman

[57] ABSTRACT

A method and system for maintaining precise electrically neutral, positive or negative atmosphere in an area, such as a textile mill, by adding charged ions to air being pumped into that area, for example, through an air conditioning duct whereby at least two spaced apart grids are mounted in the duct with one connected to a positive high voltage source and the other connected to a negative high voltage source so that both grids produce ions and the voltages applied thereto are controlled to maintain the area atmosphere neutral, positively charged or negatively charged as required to dissipate an undesired charge generated in a manufacturing process.

5 Claims, 4 Drawing Figures

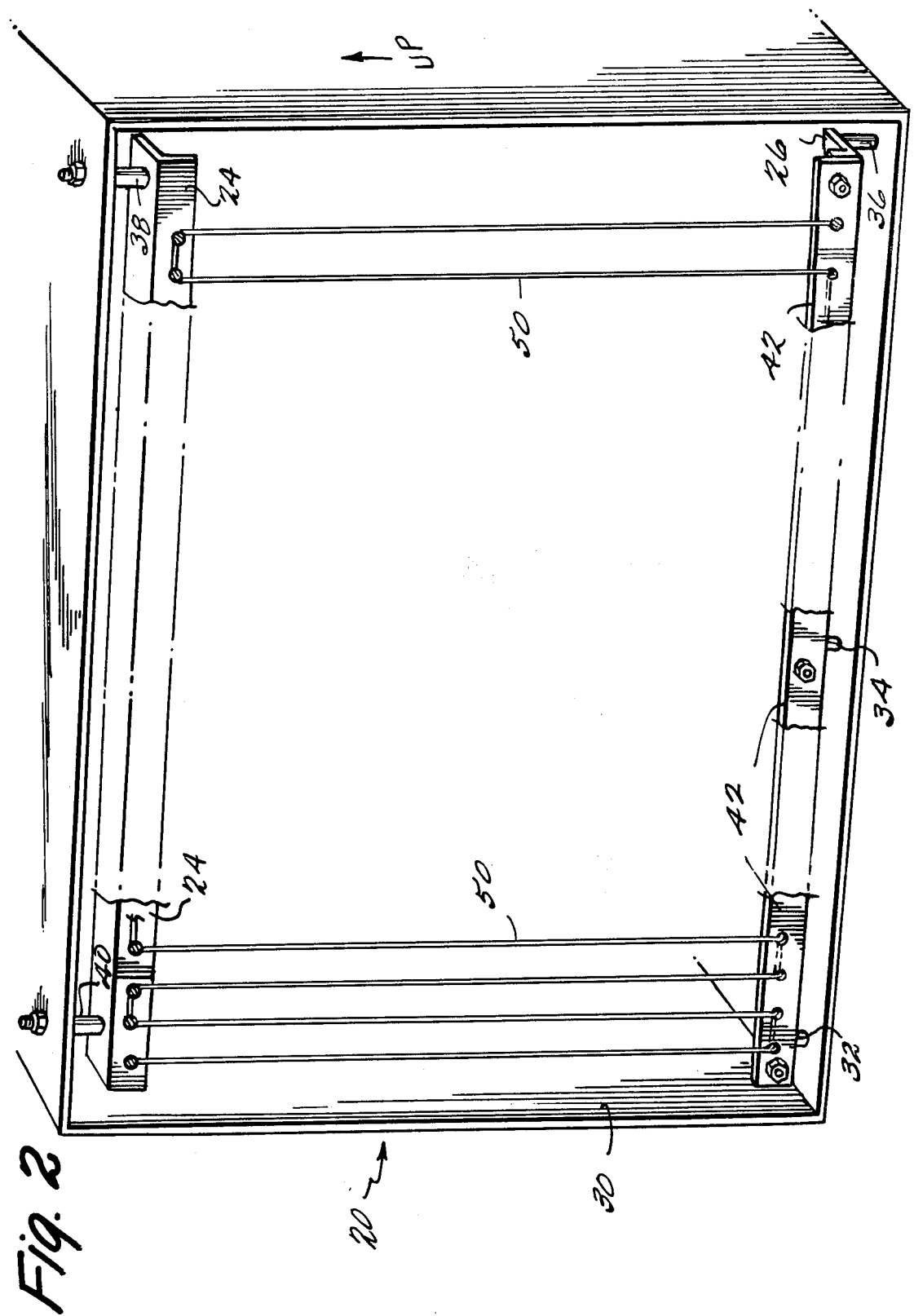

METHOD AND SYSTEM FOR MAINTAINING AN ELECTRICALLY NEUTRAL ATMOSPHERE

This is a division of application Ser. No. 516,199 filed Oct. 18, 1974 now U.S. Pat. No. 3,942,072.

BRIEF DESCRIPTION OF THE PRIOR ART AND SUMMARY OF THE INVENTION

The invention relates to a method and system for maintaining an electrically neutral or positively or negatively charged atmosphere in a given area such as a textile mill.

Almost any area, particularly a confined area where large machines are in operation, such as a textile mill, has either a positive or negative electrical field. In most instances, this field is undetectable and causes no problem with respect to the desired activities that are being undertaken in the area. However, in certain situations, particularly in conjunction with operation of textile machines, such as looms or the like, even a rather small electrical field causes problems with regard to proper operation of the machines. One such problem is the undesirable buildup or accumulation of lint on machine parts. Accordingly, it is usually desirable to attempt to maintain an atmosphere in the area which is as close to electrically neutral as possible, or biased with a polarity opposite to the charge generated by the manufacturing process.

In the past, there have been a number of attempts to automatically adjust the electrical field within an area by supplying ions of a polarity opposite to that of a detected field until an essentially neutral field condition has been produced. For example, the patent to Michener et al, U.S. Pat. No. 3,387,181, describes a system in which ions passing through a tube are collected on metallic wire pads and counted. A direct current charged grid disposed in the main air stream of an air circulating system is then controlled in polarity and intensity of grid current as a function of the detected ion count so as to maintain a neutral atmosphere in the room. This type of device has several drawbacks which make it impractical for most applications.

First, the grid current is not regulated directly as a function of the electrical field within the work area but rather as a function of the ions which are counted in a tube. This count is, therefore, only generally related to the field potential within the room. It is possible that a considerable electrical field may exist without the existence of even a small number of ions. Further, the Michener System is slow in responding no changes in electrical field potential within the area and tends to overshoot when correcting a positive or negative potential.

The patent to Huber, U.S. Pat. No. 3,870,933, Ser. No. 384,229 field July 31, 1973, describes another system of this type which, however, employs a unique detector element which produces an ion cloud in the vicinity of a metallic probe. The ion cloud interacts with the electrical field in the area that is desired to be kept electrically neutral to produce a signal indicating the polarity and magnitude of the electrical field. This control signal can then be used to control arrangement for adding positive and negative ions to the air conditioning system, for example, by the use of chemicals or the like. The patent further mentions that a grid can be placed in the air conditioning duct to emit ions to neutralize the electrical field in response to the signal provided by the unique detector.

Most textile areas are electrically negative so that positive ions must be added to the room to bring it back to an electrically neutral condition or a predetermined positive level. However, occasionally positive electrical fields are produced and it is desirable also in any system to have the ability to produce negatve ions and thus bring a positive electrical field back to a less positive, neutral, or perhaps a negative condition. When using an electrical grid to which a high voltage is applied to generate ions, one of two techniques can be employed to give the system flexibility to produce either negative or positive ions.

First, a single grid can be mounted in the duct and a switch provided for coupling the grid either to a negative or a positive power supply. However, in view of the high voltages which are normally applied to the grids, switching of the grid from one power source to the other is difficult and undesirable. The alternative technique is to provide two grids which are spaced apart, one of the grids connected to a positive power source and the other grid connected to a negative power source with care taken not to allow the two power supplies to operate at the same time.

According to the invention of this application, it has been discovered that providing two spaced apart grids in an air conditioning duct or the like, which supplies air to a room to be kept electrically neutral or at a precise positive or negative level and operating both at the same time to produce both positive and negative ions surprisingly requires less potential on the grid contacted last by the air flowing within the duct for maintaining a given desired atmospheric charge level than a single positive grid in a situation where positive ions must be added to neutralize a negative electrical field. Further, overshoot problems are dramatically reduced and in many instances are substantially eliminated when correcting such a field by the invention of this application. It has been found that a grid comprised of a number of individual fine wires extending roughly in parallel with a spacing of, for example three inches, provides satisfactory operation and it has further been found that a separation between the positive and negative grids of between 6 and 18 inches, and preferably 12 inches, produces desirable results.

While the reasons for these surprising results are not entirely understood, it is believed that the interaction of each grid with the ions of the opposite polarity and the resultant acceleration or deceleration of these ions as a result of that interaction plays some part in the results. It is further believed that by adjustment of the grid connected to the polarity which is the same as the polarity of the electrical field to be neutralized, overshoot in the neutralizing process is reduced.

Many other objects and purposes of the invention will be clear from the following detailed description of the drawings.

BRIEF DESCRIPTION OF THE DRAWINGS

FIG. 2 shows a perspective view of one of the grids of this invention mounted in an air conditioning duct;

DETAILED DESCRIPTION OF THE DRAWINGS

Figure 1:
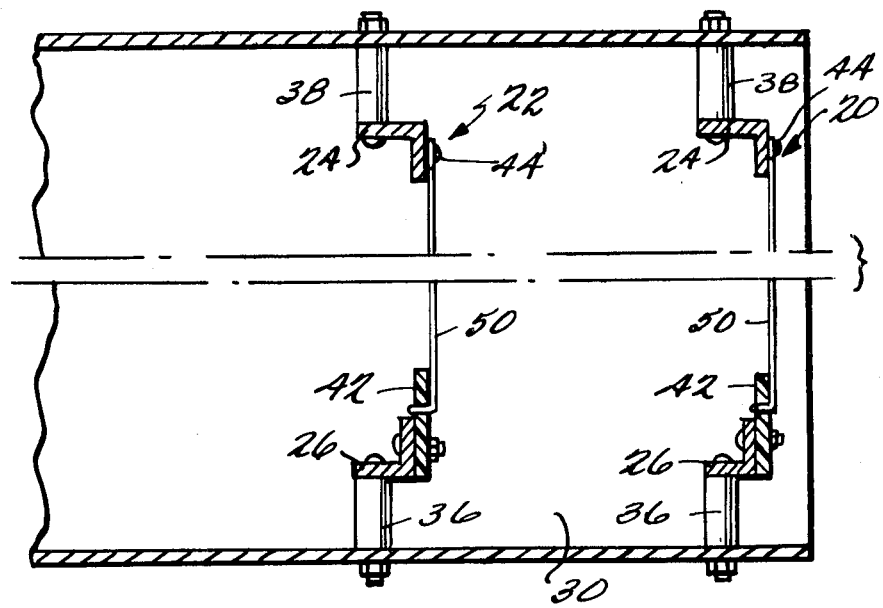
FIG. 1 shows a schematic side view of the unique grids of this invention, mounted in an air conditioning duct which supplies air to a room or the like which is to be kept in electrically neutral or any desired positive or negative condition.
Figure 3:
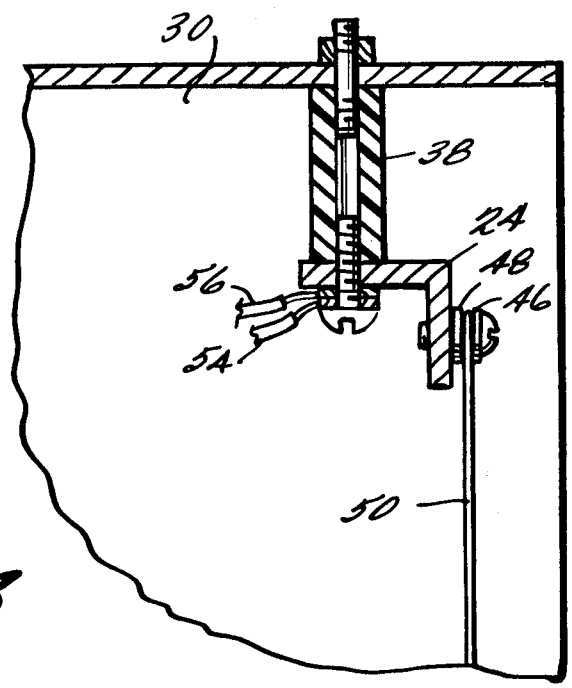
FIG. 3 shows a view of the upper grid connection.

Reference is now made particularly to FIGS. 1–3 which illustrate the unique construction of the grid of this invention. Grids 20 and 22 are preferably mounted as shown in an air conditioning duct which leads directly into the room that is to be maintained in an electrically neutral condition. It has been found that results are optimized for a plant which is generally negative, and to which accordingly must be supplied positive ions, by mounting the grid to which is coupled the negative power supply so that air flows first through the negative grid before encountering the grid to which the positive power supply is connected. In the arrangement of FIG. 1, the grid 20 accordingly would preferably be connected to a negative power supply while the grid 22 would preferably be connected to a positive power supply.

Further, it has been found that results are optimized for a plant which is generally positive, and to which accordingly must be supplied negative ions, by mounting the grid to which the positive power supply is coupled so that air flows first through the positive grid before encountering the grid to which the negative power supply is connected. In this arrangement, the grid 20 in FIG. 1 would become the positive grid and would, therefore, be connected to the positive power supply while the grid 22 would become the negative grid and, therefore, be connected to the negative power supply.

Further, in each of the above instances the potential required to power the second grid or the grid through which the air stream last flows prior to passing into the area is surprisingly reduced from what would be expected to maintain the desired atmospheric condition.

As best seen in FIG. 2, each of the grids 20 and 22 preferably includes a pair of L-shaped aluminum bars 24 and 26. Each of these bars is mounted to respective opposing surfaces of the duct, which typically is metal, by three conventional insulator posts. Duct 30 is typically square in cross section and 3 feet by 3 feet in dimension, but may be any size or shape. Bar 26 is mounted on duct 30 by insulator posts 32, 34 and 36, while L-shaped bar 24 is mounted by two insulator posts 38 and 40. An insulating bar 42 which is preferably of plastic material is fixedly connected to L-shaped bar 26 with a plurality of electrical fasteners attached to plastic bar 42 along its length. Similarly, aluminum bar 24 has a plurality of electrical fasteners disposed along its length. As can be seen best in FIG. 3, each of these electrical fasteners can simply comprise a screw 44 with a pair of washers 46 and 48, mounted thereon, so that a wire can be looped about screw 44, between washers 46 and 48.

Wire 50 is preferably wound in place between bars 24 and 42 as a single unbroken wire and the portions extending between the fasteners of bar 42 then removed in order to prevent a short circuit should the wire 50 be broken at any portion thereof and fall directly onto the bottom of duct 30.

Upper bar 24 is preferably connected as can be seen best in FIG. 3 to a high voltage source by terminals 54 and 56. As indicated, grid 20 is connected preferably to a negative voltage source while grid 22 is connected to a positive high voltage source.

Figure 4:
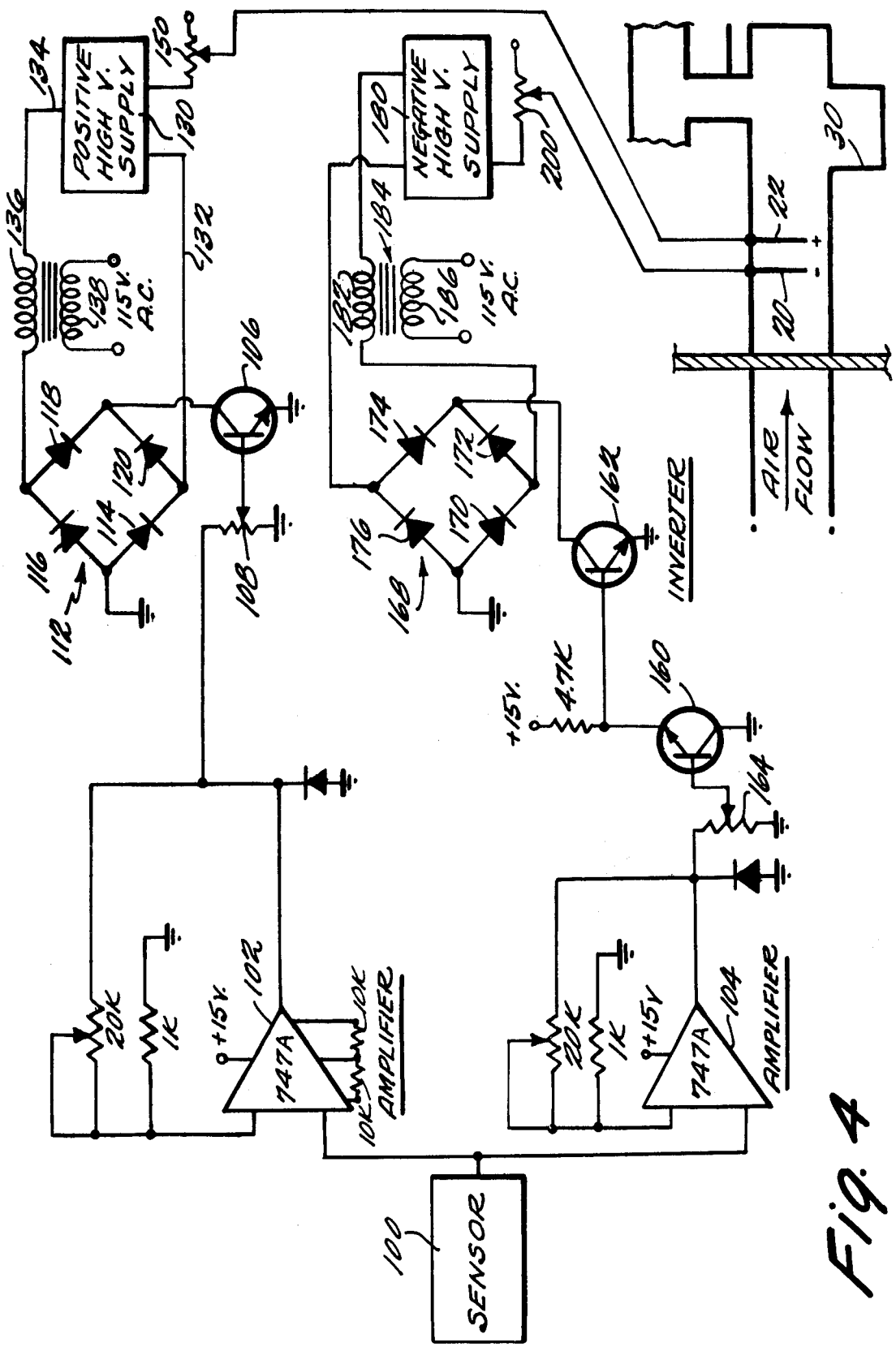
FIG. 4 shows an electrical schematic of the unique circuitry of this invention for applying appropriate voltages to the two grids to cause the air in the room where the sensor is located to be kept in an electrically neutral or any desired positive or negative condition.

Reference is now made to FIG. 4, which illustrates a detailed circuit schematic for applying the correct positive and negative voltages to grids 20 and 22. Sensor 100 provides an electrical output signal which varies as a function of the magnitude and polarity of the electrical field in the area that is to be kept neutral or at any desired charge level either positive or negative. This sensor is preferably the type described in the above-mentioned U.S. Pat. No. 3,870,933 to Huber, Ser. No. 384,229, filed July 31, 1973. This particular sensor provides an output signal which varies between zero and one volt D.C., with 0.5 volt representing a neutral environmental condition while the range 0 to 0.5 represents a positive electrical field and the range 0.5 to 1 represents a negatve electrical field. If desired, the meter scale can be changed, for example, to be between −5 volts and +5 volts with the neutral condition being at ground. In any instance, with respect to that particular sensor and its output between 0 and 1 volt, the signal is supplied to a conventional operational amplifier 102 which amplifies the output of sensor 100, for example by 10. Similarly, the output of sensor 100 is applied to a second operational amplifer 104 which provides a similarly amplified but inverted output.

The output of amplifier 102 is applied to the base of transistor 106 via conventional potentiometer 108 which can be varied to adjust the sensitivity and operation of the control circuitry. The collector of transistor 106 is connected to a conventional bilateral switch 112 which is comprised of diodes 114, 116, 118 and 120. In particular, the collector of transistor 106 is connected to the intersection of diodes 118 and 120 which diodes each comprise a branch of the bilaterial switch 112. The connection between diodes 114 and 116 similarly is connected to ground as is the emitter of transistor 106. A conventional positive high voltage supply 130 is provided with two input terminals 132 and 134. One of these terminals is connected directly between the connection of diodes 114 and 120, while the other input terminal is connected via winding 136 to the connection between diodes 116 and 118. Winding 136, together with winding 138 comprises a transformer with a conventional A.C. signal applied to winding 138, for example at 115 volts, 60 Hertz.

When transistor 106 is in its non-conductive condition, no current can flow through the 112, and accordingly, the output of the high voltage supply 130, which is connected to the positive grid via a conventional adjustment potentiometer 150 produces no voltage so that the grid in turn does not produce any ions. However, when the signal from sensor 100 is in a range indicating the need for production of positive ions according to the adjustment of potentiometer 108, transistor 106 is driven positive so that current flows through that transistor to ground, the amount of current being related to the level of conduction of transistor 106, and the positive high voltage supply 130 produces an output voltage having a magnitude related to the input signal, so that positive ions are produced by the positive grid 22 mounted in air conditioning duct 30.

Similarly, the output of amplifier 104, inverted by transistor 160 is supplied to the base of a further transistor 162 with the magnitude thereof being adjusted by conventional potentiometer 164. Transistor 162, like transistor 106, is connected between two branches of a conventional bilateral switch 168 comprising diodes 170, 172, 174 and 176. In particular, the collector of transistor 162 is connected between diodes 172 and 174 with the connection between diodes 170 and 176 being connected to ground. A negative high voltage supply 180 which is identical to the positive high voltage supply 130, except as to the polarity of its output is similarly connected to bilateral switch 168 via coil 182 of transformer 184. Transformer 184 similarly has a second coil 186 to which an alternating current voltage, for example 115 volts, αHertz, is applied. The output of the negative high voltage signal is similarly applied to grid 20 via potentiometer 200.

Whenever sensor 100 detects a deviation from a neutral condition, a signal is produced which, amplified by amplifiers 102 and 104, causes transistors 106 and 162 to be shifted into their conductive states and positive and negative voltages both to be simultaneously applied to grids 22 and 20.

The following chart sets forth detected voltages and amperages for positive and negative grids as described above in an air conditioning system for keeping an area neutral which was generally negative.

| Negative Grid | | | Positive Grid | | | |
|---|---|---|---|---|---|---|
| Inches Between Grids | μA | KV | Inches | μA | KV | Efficiency |
| 6 | 165 | 13.5 | 6 | 125 | 11.5 | 76% |
| 12 | 90 | 15.0 | 12 | 75 | 13 | 94% |
| 18 | 110 | 15.0 | 18 | 40 | 8–12 | 36% |
| 24 | 125 | 14.0 | 24 | 25 | 8–12 | 20% |

Many changes and modifications can, of course, be carried out without departing from the scope of the invention. Accordingly, that scope is intended to be limited only by the scope of the appended claims.

What is claimed is:

1. An electrical circuit comprising:
a first bi-lateral switch having four branches,
a first power supply for receiving a first variable controlled A.C. input signal at input terminals and providing a D.C. high voltage output,
a first transformer having a first winding connected to a source of alternating voltage and a second winding connected between one of said input terminals of said first power supply and the connection between first and second of said branches of said first bi-lateral switch, the other input terminal of said first power supply being connected to the connection between third and fourth of said branches of said first bi-lateral switch,
first electronic switch means having a conductive and a non-conductive condition and responsive to an input signal for shifting between said conditions, said switch means being connected to the connection between said first and third branches of said first bi-lateral switch for coupling that connection to ground when said switch means is in said conductive condition, the connection between said second and fourth branches of said first bi-lateral switch being connected to ground so that when said first switch means is in its non-conductive condition no current flows through said first bi-lateral switch and accordingly through said first power supply, and when said first switch means in its conductive condition current flows through said first bi-lateral switch and accordingly through said first power supply,
a second bi-lateral switch having four branches,
a second power supply for receiving a second variable controlled A.C. input signal at input terminals and providing a D.C. high voltage output of opposite polarity to the output voltage of said first power supply,
a second transformer having a first winding connected to a source of alternating voltage and a second winding connected between one of said input terminals of said second supply and the connection between first and second of said branches of said second bi-lateral switch, the other input terminal of said second power supply being connected to the connection between third and fourth of said branches of said second bi-lateral switch,
second electronic switch means having a conductive and a non-conductive condition and responsive to an input signal for shifting between said conditions, said second switch means being connected to the connection between said first and third branches of said second bi-lateral switch for coupling that connection to ground when said second switch means is in said conductive condition, the connection between said second and fourth branches of said second bi-lateral switch being connected to ground so that when said second switch means is in its non-conductive condition no current flows through said second bi-lateral switch and accordingly through said second power supply, and when said second switch means in its conductive condition current flows through said second bi-lateral switch and accordingly through said second power supply, and
means for producing said first and second input signals including sensor means for producing a control signal, first and second means for each amplifying said control signal, first and second variable resistor means, respectively connected to the outputs of said first and second amplifying means, first means connecting said first variable resistor means to said first bi-lateral switch and second means connecting said second variable resistor means to said second bi-lateral switch including means for inverting the output of said second variable resistor means.

2. A circuit as in claim 1 wherein said switch means has a resistance which varies as a function of said input signal so that the output voltage provided by said power supply varies in amplitude as a function of said input signal.

3. A circuit as in claim 2 wherein said switch means is a transistor.

4. A circuit as in claim 3 wherein said rectifier includes a diode in each of said branches.

5. A circuit as in claim 1 further including a first electrical grid connected to the first power supply for producing negative ions in air passing through said first grid and a second electrical grid connected to said second power supply for producing positive ions in the air passing through said second grid.

* * * * *